July 29, 1930.  G. A. McCREA  1,771,443
TRAP CHAIN RING
Filed Sept. 28, 1928

Inventor
G. A. McCrea

By Lacey & Lacey, Attorneys

Patented July 29, 1930

1,771,443

UNITED STATES PATENT OFFICE

GEORGE A. McCREA, OF FLINT, MICHIGAN

TRAP-CHAIN RING

Application filed September 28, 1928. Serial No. 309,049.

The present invention is directed to improvements in trap chain rings.

The primary object of the invention is to provide a device of this character so constructed that the trapped animal after returning to deep water will be prevented from reaching land or shallow water, and thus drowned.

Another object of the invention is to provide a device of this character so constructed that it can move downwardly freely upon a stake or pole, but is prevented from moving upwardly thereon so that when the animal carrying the trap into deep water will be prevented from rising to the surface or reaching land, or shallow water.

It is well known that as soon as an animal is caught with a spring jaw trap it immediately plunges into the water, and not being able to free itself from the trap it returns to land or shallow water and ofttimes struggles loose with the loss of a limb, and it is to prevent such occurrences that the present invention has been perfected.

A device constructed in accordance with my invention relieves suffering of the animal since upon returning to the water it is held submerged and quickly drowns.

With these and other objects in view, this invention resides in the novel features of construction, formation, combination and arrangement of parts to be hereinafter more fully described, claimed and illustrated in the accompanying drawing, in which:—

Figure 1:
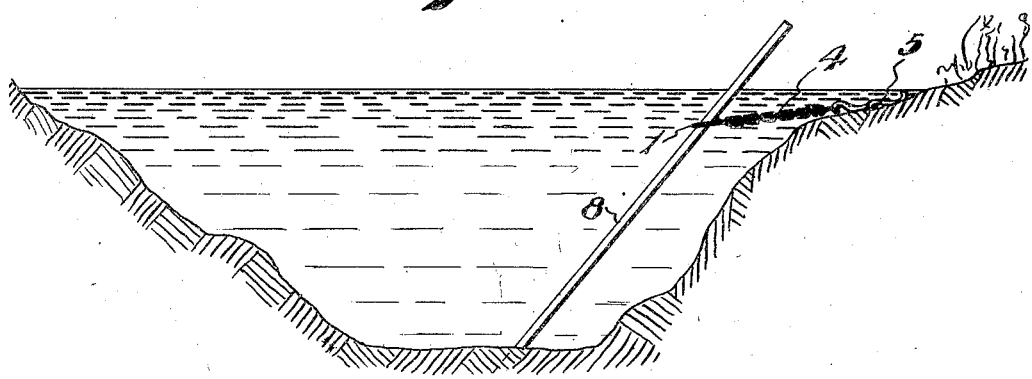
Figure 1 is a view of the device showing the same in its operative position.
Figure 2:
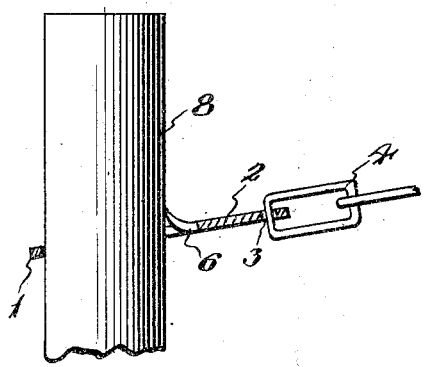
Figure 2 is a sectional view of the device, showing it gripped upon a stake.
Figure 3:
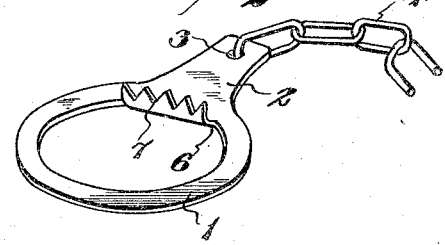
Figure 3 is a perspective view of the device.

Referring to the drawing, 1 designates a ring, preferably formed from suitable gage sheet metal and provided with a shank 2, said shank having an opening 3 formed near its outer end, the purpose of which will be later explained.

The trap chain 4 has one of its terminal links engaged in the opening 3, while the other terminal link is connected to a conventional form of spring jaw trap 5.

The ring has extended into its opening a lip 6, said lip being gradually curved upwardly. This lip is provided with a plurality of teeth 7, the points of which are disposed above the plane of the ring so that when strain is applied to the shank the ring will tilt and cause the teeth to bite into the stake 8, thereby preventing the ring from moving upwardly on the stake.

As shown in Figure 1 the stake 8 is embedded in the stream at an angle. Obviously the weight of the trap 5 will hold the chain taut, but as soon as the animal is trapped and returns to deep water the chain will become slack and the ring will quickly slide downwardly upon the stake. When the animal attempts to return to shallow water or to the bank the ring will tilt thus causing the teeth 7 to bite into the stake, thus preventing the animal from rising to the surface.

When the device is used in marshes where the water is comparatively shallow the stake is set vertically and a hole may be dug around the embedded end of the stake to permit the ring to drop therein to grip the stake near its lower end, thus preventing the animal from rising to the surface.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

1. A device of the class described, comprising a ring, a shank carried by the ring, a trap chain secured to the shank, a lip extending from the inner periphery of the ring, teeth carried by the lip and extended above the plane of the ring for biting engagement with the stake when the ring is tilted upon strain being applied to the shank.

2. A device of the class described comprising a ring, a lip extending from the inner periphery of the ring, and teeth carried by the lip and extended above the plane of the ring, as and for the purpose set forth.

In testimony whereof I affix my signature.

GEORGE A. McCREA. [L. S.]